United States Patent Office 3,708,295

Patented Jan. 2, 1973

3,708,295

PROCESS FOR THE MANUFACTURE OF METALLIC, ELECTRICALLY CONDUCTIVE PATTERNS

Ernst Schumacher, Fribourg, Switzerland, assignor to Ciba-Geigy AG, Basel, Switzerland No Drawing. Filed Mar. 10, 1971, Ser. No. 123,059
Claims priority, application Switzerland, Mar. 13, 1970, 3,823/70
Int. Cl. G03c *5/00*
U.S. Cl. 96—36.2 8 Claims

ABSTRACT OF THE DISCLOSURE

Process for the manufacture of a metallic, electrically conductive pattern by treating a vesicular record material containing a metallic layer with a first lipophilic, organic solvent for opening the image bubbles, hydrophilizing the image area, etching away the metal in the image area and removing the residual vesicular material with a second, lipophilic, organic solvent.

This invention relates to a process for the manufacture of metallic, electrically conductive patterns.

According to the present invention there is provided a process for the manufacture of a metallic, electrically conductive pattern which comprises treating a record material containing on a carrier a silver or copper layer and immediately above said layer a layer of thermoplastic material containing a vesicular image, with a first lipophilic, organic solvent which attacks the thermoplastic material so that the image bubbles are opened and the areas with bubbles made porous, rendering the image area hydrophilic by treatment with a surfactant, etching away the metal image wise and removing the residual thermoplastic material by treatment with a second, lipophilic, organic solvent.

In contrast to other known processes in which light-absorbing images are formed, the vesicular processes produce light-scattering images. The light-sensitive recording materials for the vesicular process generally comprise, on a carrier, a thermoplastic substrate in which are dispersed light-sensitive compounds (especially compounds sensitive to ultraviolet light), which form during exposure and development, light-scattering centres corresponding to the image. These light-scattering centres consist of microscopic, closed gas bubbles, which are firmly embedded in the hydrophobic thermoplastic material. Suitable thermoplastic materials are, for example, polymers such as polyvinylidene chloride and polymethacrylonitrile and copolymers of acrylonitrile with ethyl acrylate or vinylidene chloride. The layer of thermoplastic material is adherent to a carrier made, for example, from polyester or paper. The light-sensitive substances in the said layer are generally diazonium salts, which liberate nitrogen during the photographic decomposition. The nitrogen causes bubbles to form during the thermal development.

Vesicular images are usually obtained by one of the following three main processes:

| Process | UV exposure | Development | Fixing |
|---|---|---|---|
| 1 | Image wise | E.g. 2 seconds at 130° C. | Diffuse total exposure with UV at room temperature. |
| 2 | Image wise, latent image diffuses away. | Xenon flash | |
| 3 | Diffuse total exposure. | Image wise exposure with heat. | Spontaneous at room temperature. |

The vesicular images can be produced thermally, e.g. by a hot point or a hot relief image.

There are also vesicular images which are produced by pressure.

Although these vesicular images are produced very easily by a dry process, this method of photography has not been widely adopted. There are three important reasons for this: first, light-scattering images have a maximum density and characteristic curve dependent on the lighting and angle of view, secondly their resolution capacity is limited by the quickly diminishing scatter power of gas bubbles of which the diameter is equal to or less than twice the light wavelength, and thirdly the granularity exhibits a curious anomaly with a maximum in the medium densities, which are of most importance to the image.

The present invention combines this straightforward, dry vesicular process with a new etching process to make possible the manufacture of electrically conductive metal patterns, e.g. so-called printed circuits. The process of the invention is simple, rapid and suitable for automation.

As first lipophilic solvent, there are preferably used 2-methoxyethanol or binary mixtures of 2-methoxyethanol, acetone, methyl ethyl ketone, dimethyl formamide, tetrahydrofurane, methylene chloride or ethyl acetate with 2-ethoxy ethanol, 2-propoxy ethanol or 1-ethoxy-2-propoxyethylene. As second lipophilic solvent there is preferably used acetone, methyl ethyl ketone or methylene chloride.

Nitric acid, preferably diluted, or an aqueous iron (III) chloride solution is used as a rule for etching or dissolving the metal image under the image areas with bubbles.

A wide variety of materials can be employed as carrier for the record material, but plastics, foils or boards, which are not attacked by the lipophilic solvents, are particularly suitable.

The bubbles can be advantageously opened by immersion in vapours of organic lipophilic solvents of the specified type. A preferred method comprises immersion in the vapour of acetone, methylene chloride or dimethyl formamide for 1 to 20 seconds.

The following example will serve to illustrate the invention:

EXAMPLE

A polyester carrier is treated with silver vapour to deposit a silver coating layer or is provided with a thin copper layer, and the metal layer is coated with a layer suitable for vesicular processes, which contains a diazonium salt in a polyvinylidene chloride substrate. The material is exposed and placed in 2-methoxy-ethanol for 2 minutes. It is then treated for 20 seconds in ethanol and allowed to dry in air. The material with a pore image thus obtained is immersed in a 5% solution of a mixture of sodium dibutyl naphthalene sulphonate and sodium diisopropylnaphthalene sulphonate. The material is treated with 2N nitric acid, whereby both the coating and the metal below it are dissolved at the image areas. Finally, the rest of the polyvinylidene chloride layer is dissolved in a lipophilic solvent and the metal layer is electroplated.

I claim:

1. A process for the manufacture of a metallic, electrically conductive pattern which comprises treating a record material containing on a carrier a silver or copper layer and immediately above said layer a layer of thermoplastic hydrophobic material containing a vesicular image, with a first lipophilic, organic solvent which attacks the thermoplastic material so that the image bubbles are opened and the areas with bubbles made porous, rendering the image area hydrophilic by treatment with a surfactant, etching away the metal in the image area and removing the residual thermoplatic material by treatment with a second, lipophilic, organic solvent.

2. A process according to claim 1, wherein the first lipophilic organic solvent is 2-methoxy-ethanol or a binary mixture of 2-methoxyethanol, acetone, methyl ethyl ketone, dimethyl formamide, tetrahydrofurane, methylene chloride or ethyl acetate with 2-ethoxy ethanol, 2-propoxy ethanol or 1-ethoxy 2-propoxy ethylene.

3. A process according to claim 1 wherein the second lipophilic solvent is acetone, methyl ethyl ketone, or methylene chloride.

4. A process according to claim 1, wherein the metal image is etched away with nitric acid solution.

5. A process according to claim 1 wherein the metal layer is a copper layer and the metal image is etched away with iron chloride solution.

6. A process according to claim 1, in which the carrier of the record material is a plastic foil or board.

7. A process according to claim 6, wherein the bubbles are opened by immersion in the vapour of acetone, methylene chloride or dimethyl formamide for 1 to 20 seconds.

8. A process according to claim 1 wherein the bubbles are opened by immersion in vapours of the lipophilic organic solvent.

References Cited

UNITED STATES PATENTS

| | | | |
|---|---|---|---|
| 845,138 | 2/1907 | Spitzer | 96—36.3 |
| 1,571,103 | 1/1926 | Sury | 96—36 X |
| 3,120,437 | 2/1964 | Lindquist | 96—49 |
| 3,409,487 | 1/1968 | Fry et al. | 156—13 |
| 3,461,550 | 8/1969 | Aklufi | 156—13 UX |
| 3,485,631 | 12/1969 | Nutley | 96—49 X |

DAVID KLEIN, Primary Examiner

U.S. Cl. X.R.

156—13